United States Patent

(12) United States Patent
Morandin (10) Patent No.: US 8,958,329 B2
(45) Date of Patent: Feb. 17, 2015

(54) FABRIC LOAD BALANCING

(71) Applicant: Cisco Technology, Inc., San Jose, CA (US)

(72) Inventor: Guglielmo Morandin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 95 days.

(21) Appl. No.: 13/681,607

(22) Filed: Nov. 20, 2012

(65) Prior Publication Data

US 2014/0140212 A1    May 22, 2014

(51) Int. Cl.
| | | |
|---|---|---|
| H04J 1/16 | (2006.01) | |
| H04L 12/803 | (2013.01) | |
| H04L 12/931 | (2013.01) | |
| H04L 12/947 | (2013.01) | |
| H04L 12/801 | (2013.01) | |

(52) U.S. Cl.
CPC ............ *H04L 47/125* (2013.01); *H04L 49/505* (2013.01); *H04L 49/25* (2013.01); *H04L 47/14* (2013.01); *H04L 47/15* (2013.01)
USPC .......................................... 370/252; 370/229

(58) Field of Classification Search
CPC ... H04W 24/00; H04L 43/50; H04L 43/0852; H04L 43/08; H04L 47/10; H04L 47/35; H04L 47/30; H04L 47/32; H04L 47/11; H04L 47/12; H04B 17/003
USPC .............. 370/229, 231, 230.1, 232, 234, 235, 370/332, 252
See application file for complete search history.

(56) References Cited

U.S. PATENT DOCUMENTS

| | | |
|---|---|---|
| 6,256,675 B1 | 7/2001 | Rabinovich |
| 6,430,153 B1 | 8/2002 | Hughes et al. |
| 6,603,772 B1 | 8/2003 | Moussavi et al. |
| 6,654,363 B1 | 11/2003 | Li et al. |
| 6,717,945 B1 | 4/2004 | Jue et al. |
| 6,751,219 B1 | 6/2004 | Lipp et al. |

(Continued)

FOREIGN PATENT DOCUMENTS

| | | |
|---|---|---|
| EP | 0661851 B1 | 7/1995 |
| EP | 1133110 A2 | 9/2001 |

(Continued)

OTHER PUBLICATIONS

International Search Report and Written Opinion from related PCT Application No. PCT/US2013/069562, Feb. 10, 2014, WO.

(Continued)

*Primary Examiner* — Brenda H Pham
(74) *Attorney, Agent, or Firm* — Lempia Summerfield Katz LLC (57) ABSTRACT

In one implementation, a series of nodes in a network or a fabric communicate congestion values upstream against the flow of data packets. A current node determines average data intensity for each of a set of outputs. The average data intensity is based on recent data packet transmissions respectively to each of the set of outputs. The current node receives an output congestion value from each of the set of outputs and calculates an effective congestion value for each of the plurality of outputs as a function of the output congestion value and the average data intensity. The current node performs a comparison of the effective congestion values for the plurality of outputs and selects an output based on the comparison.

16 Claims, 7 Drawing Sheets

(56) References Cited

U.S. PATENT DOCUMENTS

| | | |
|---|---|---|
| 6,775,280 B1 | 8/2004 | Ma et al. |
| 6,999,453 B1 | 2/2006 | Chemla et al. |
| 7,519,054 B2 | 4/2009 | Varma |
| 7,675,857 B1 | 3/2010 | Chesson |
| 7,859,999 B1 | 12/2010 | Basu et al. |
| 8,189,476 B1 | 5/2012 | Rothstein et al. |
| 2002/0085578 A1 | 7/2002 | Dell et al. |
| 2002/0118689 A1 | 8/2002 | Luijten et al. |
| 2003/0021282 A1 | 1/2003 | Hospodor |
| 2003/0058802 A1 | 3/2003 | Jones et al. |
| 2003/0058880 A1 | 3/2003 | Sarkinen et al. |
| 2003/0179759 A1 | 9/2003 | Wang |
| 2004/0109412 A1 | 6/2004 | Hansson et al. |
| 2006/0045008 A1 | 3/2006 | Sun et al. |
| 2007/0076621 A1 | 4/2007 | Malhotra et al. |
| 2007/0195761 A1 | 8/2007 | Tatar et al. |
| 2008/0115128 A1 | 5/2008 | Achanta et al. |
| 2010/0220742 A1 | 9/2010 | Brewer et al. |
| 2010/0246603 A1 | 9/2010 | Rabie et al. |
| 2011/0051604 A1* | 3/2011 | Nishimura ............ 370/235 |
| 2013/0114593 A1 | 5/2013 | Jabr et al. |

FOREIGN PATENT DOCUMENTS

| | | |
|---|---|---|
| WO | WO2004023718 A2 | 3/2004 |
| WO | WO2012004689 A1 | 1/2012 |

OTHER PUBLICATIONS

Deng Pan et al., FIFO-Based Multicast Scheduling Algorithm for Virtual Output Queued Packet Switches, Oct. 2005, vol. 54, IEEE Transactions on Computers.

Devavrat Shah et al., Optimal Scheduling Algorithms for Iput-Queued Switches, 2006, IEEE.

Nick McKeown et al., The Tiny Tera: A Packet Switch Core, 1997, IEEE Micro.

Rajeev Sivaram et al., HIPIQS: A High-Performance Switch Architecture using Input Queuing, Apr. 1998, IEEE Transactions on Parallel and Distributed Systems.

A.S. Tanenbaum, et al., "Computer Networks", Dec. 31, 2011, pp. 246-264, Section 3.4 & 3.4.2, Boston, MA.

International Search Report and Written Opinion, from PCT/US2013/070235, May 23, 2014, WO.

International Search Report and Written Opinion, from PCT/US2013/072760, May 22, 2014, WO.

Partial International Search Report, from PCT/US2013/072760, Mar. 18, 2014, WO.

Partial Search Report PCT/US2013/070235, mailed Jan. 29, 2014.

Partial Search Report, from PCT/US2014/016176, Jun. 13, 2014, WO.

International Search Report and Writen Opinion, from PCT/US2014/016176, Sep. 15, 2014, WO.

* cited by examiner

FABRIC LOAD BALANCING

TECHNICAL FIELD

This disclosure relates in general to the field of internet protocol (IP) communication, more particularly, to load balancing of data paths.

BACKGROUND

Unicast data transmission involves data sent to a single destination using a single destination address. Multicast data transmission relates to the delivery of a packet, a message, or other information from a single source to a group of destination computers. Network devices define optimal distribution paths for data sent to multicast destination addresses.

A network device may include an internal interconnect that provides multiple paths through the network device. A mixture of unicast data transmission and multicast data transmission may result in asymmetries within the multiple paths through the network device. The asymmetries may become persistent imbalances in utilization of the paths or large differences in latencies among paths. Current feedback systems within a fabric do not adequately balance the paths for unicast transmissions.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a method includes determining an average data intensity for each of a plurality of outputs based on recent data packet transmissions, and receiving an output congestion value from each of the plurality of outputs. An effective congestion value is calculated for each of the plurality of outputs as a function of the output congestion value and the average data intensity. The effective congestion values are compared and an output is selected based on the comparison.

In another embodiment, an apparatus includes at least an input communication interface and a controller. The input communication interface is configured to receive an output congestion value from eligible outputs. The controller is configured to calculate an effective congestion value as a function of the output congestion value and an average data intensity. The processor selects one of the eligible outputs based on a comparison of the effective congestion values for the outputs.

In another embodiment, a computer readable medium includes instructions configured to determine average data intensity for outputs available to a current node, and receive an output congestion value from a plurality of downstream nodes. An effective congestion value for the outputs is a function of the output congestion value and the average data intensity. The lowest of the effective congestion values for the outputs is selected and forwarded to an upstream node.

Example Embodiments

The following embodiments relate to load balancing in a data switch, a switched fabric, or another network topology. Each of these examples includes multiple nodes in multiple stages that are coupled via switches such as a crossbar switch. The term fabric or switch may be used to refer to the network device including the fabric and arrangement of internal nodes or an arrangement of network devices. In either scenario, the arrangement includes multiple paths through multiple nodes from one end to the other. The features described in the following embodiments may be applied to either scenario.

The fabric includes multiple interconnect stages and multiple paths through the stages for packets to be transported to a destination. A path choice is made at each stage to select a particular node at the subsequent stage. Even distribution of packets among the nodes does not always result in optimal load balancing because capacity may be different in different paths. When the later stages are not evenly loaded, links near earlier stages may remain lightly loaded such that there is no indication of the congestion at the earlier stages. Load balancing decisions made based on congestion in earlier stages are ineffective without knowledge of congestion at later stages. The following embodiments distribute load balancing among nodes in multiple stages so that congestion information is propagated between stages and load balancing decisions are made upstream at nodes closer to the source in order to evenly load the downstream stages. Such fabric load balancing may equalize the delay among the multiple paths across multiple stages so that the delay is nearly the same regardless of the path that each packet takes.

The term fabric relates to the grid-like pattern of the crossbar switch that connects multiple inputs to multiple outputs in a matrix arrangement. The crossbar switch may be referred to as a cross point switch or a matrix switch. The crossbar switch may connect M inputs and N outputs, which includes M×N cross points so that each input is selectably connected to each output. The cross points selectably connect the input lines to the output lines. In one example, the cross bar switch may have 100 inputs, 100 outputs, and 10,000 cross points. The cross bar switch may include a network of transistors or other implementations are possible. When the transistor of a cross point is enabled, the input is connected to the output through the cross point.

An arbiter or scheduler prevents multiple inputs from being connected to a single output at the same time and otherwise is configured to control the cross points. The arbiter or scheduler may comprise logic or hardware configured to output a control signal that selectively energizes the cross points. The control signal may activate or energize a transistor at each cross point. A physical connection (e.g., wire or trace) connects the arbiter to each of the cross points. The arbiter decides the order that packets are dequeued from the input queues.

Head of line blocking is common in unicast. Consider an example where the next packet in two input queues should be sent to the same output. The arbiter introduces delay to at least one of the packets because the packets cannot be sent simultaneously. Regardless of which packet is sent first, the first packet blocks the other packet. The packet being blocked could be followed by other packets that are meant for a different non-congested destination, however the packets also have to wait for the first packet of the line to leave the input queue. This phenomenon is referred to as head of line blocking. The packets are steered according to headers, which include multiprotocol label switching (MPLS) labels, a source address, a destination address, or another label.

Head of line blocking can be reduced if the communication paths of the cross bar switch are faster than the communication paths leading up to the input queues and leading away from the output queues. If the internal communication paths are faster, a portion of the delay experienced at the exit of the input queues can be "made up" or recouped by the time the packets reach the output queues. The internal communication paths may be three times faster than the external communication paths.

Figure 1:
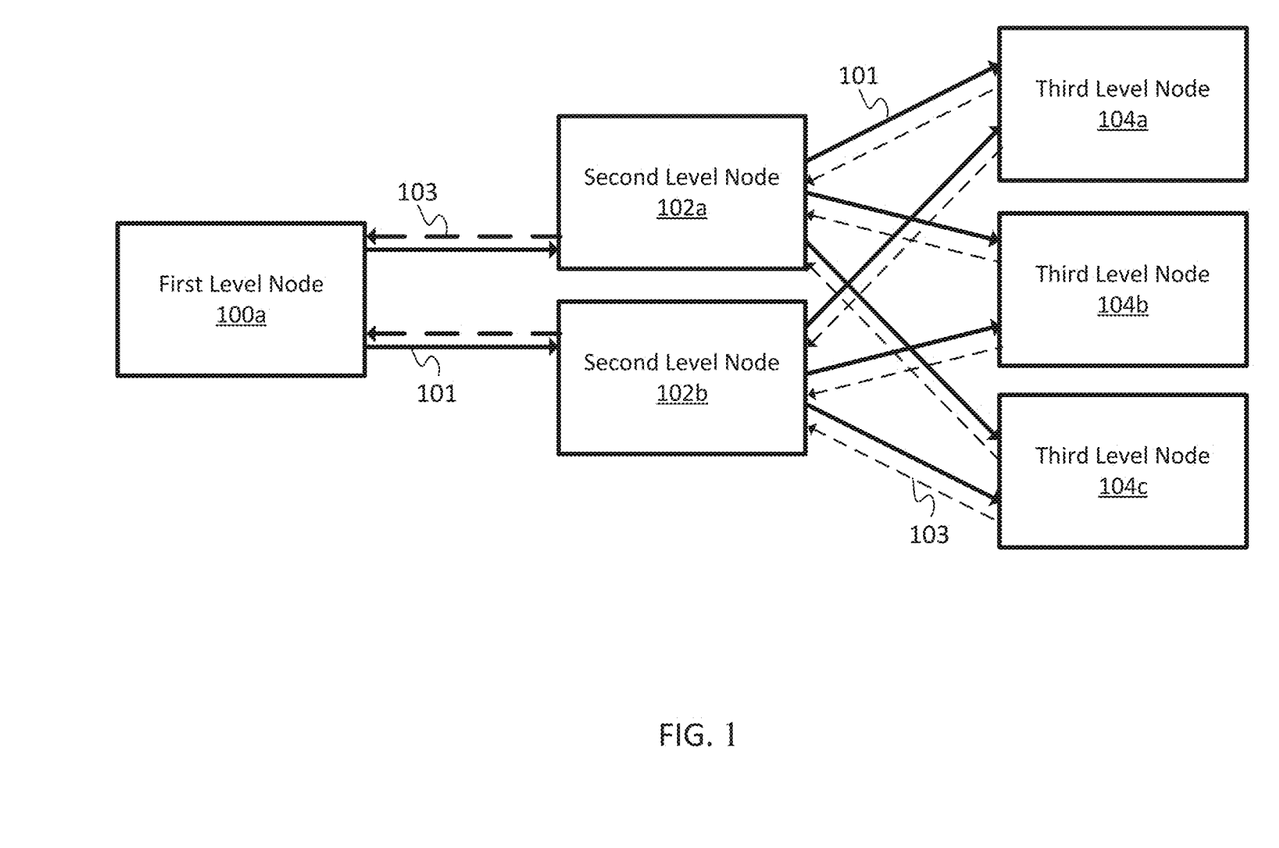
FIG. 1 illustrates an example network configured for unicast communication.

FIG. 1 illustrates an example network configured for unicast communication. The network may be a fabric including multiple stages connected by one or more crossbar switches. The network may be a local area network including network devices as the nodes. The network devices may be any device capable of replicating and forwarding data packets. Example network devices include routers and switches. The network may include from two nodes to thousands of nodes. The nodes are arranged in stages, an upstream stage includes a first level node 100a, an intermediate stage includes second level nodes 102a-b, and a downstream stage includes third level nodes 104a-c. More intermediate stages may be included. As shown by solid lines 101, data packets are forwarded from the upstream stages to the downstream stages, and, as shown by the dotted lines 103, congestion data is propagated from the downstream stages to the upstream stages.

When an incoming packet is received at an input port, the node consults a forwarding table and replicates the incoming packet for each of the egress ports assigned to endpoint computers that should receive a copy of the incoming packet.

Figure 2:
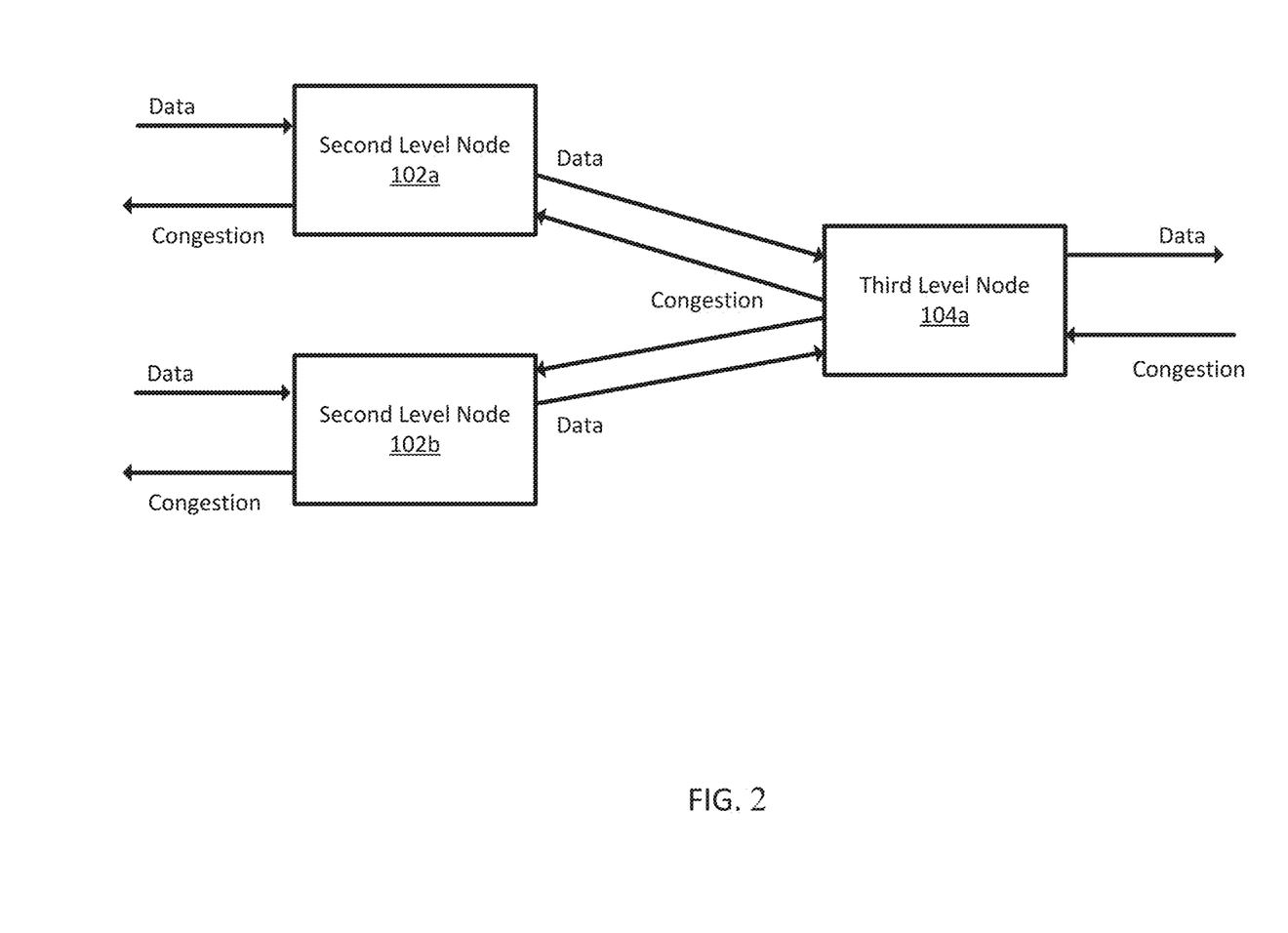
FIG. 2 illustrates an example set of nodes of the network of FIG. 1.

FIG. 2 illustrates an example set of nodes of the network of FIG. 1. Two of the second level nodes 102a-b are coupled to a third level node 104a. FIG. 2 omits details of the nodes to illustrate the downstream flow of data and the upstream flow of congestion values. The third level node 104a, which may receive a congestion value from a downstream node, calculates congestion value representations of its inputs and sends the congestion values upstream to the second level nodes 102a-b. Each of the second level nodes 102a-b calculate congestion values to send upstream to the one or more node that each of second level nodes 102a-b, respectively, is directly connected to.

Figure 3:
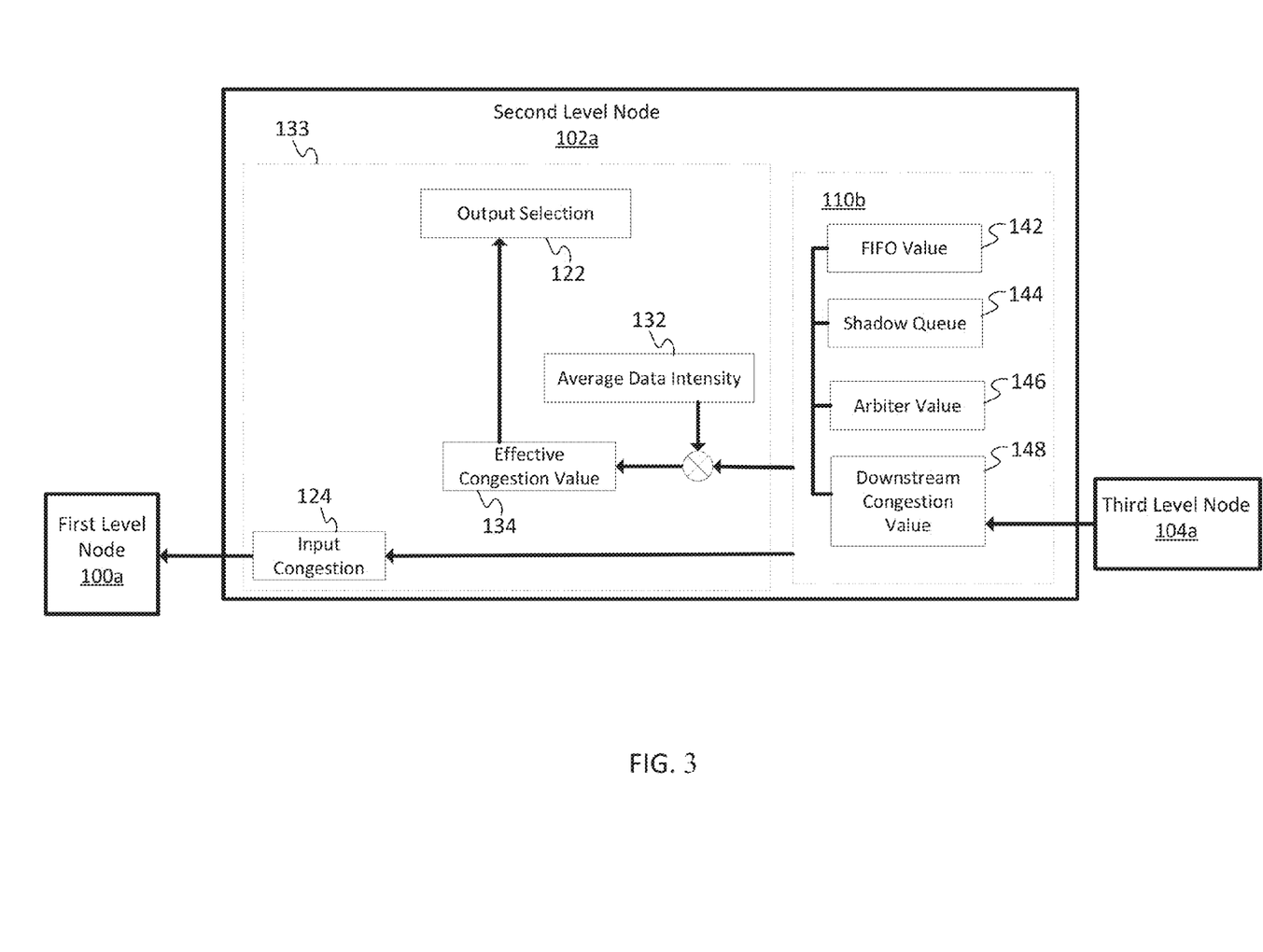
FIG. 3 illustrates a more detailed view of an example node of FIG. 2.

FIG. 3 illustrates a more detailed view of an example node of FIG. 2. Each of the nodes may include similar structure and functionality, or the nodes may be specific to function as a node in the downstream stage, the upstream stage, or an intermediate stage.

The third level node 104a determines its input congestion state and propagates it to the second level node 102a, more specifically to the downstream congestion value 148. The output congestion logic 110b, which is included for each output i of the second level node 102a, may be configured to calculate an output congestion value using Equation 1.

$$outputCongestion[i] = \max\begin{cases} outputFifo[i] \\ shadowqueue[i] \\ pendingReq[i] \times k \\ downstreamCongestion[i] \end{cases} \quad \text{Eq. 1}$$

The output congestion value is based on one or more of a first-in-first-out (FIFO) occupancy value 142 of the output, a shadow queue value 144 of the output, an arbiter value 146, and a second effective congestion value (e.g., downstream congestion value 148). The output congestion value may be selected as the maximum of the first-in-first-out occupancy value of the output, the shadow queue value of the output, the arbiter value, and the second effective congestion value. Alternatively, the output congestion value may be a maximum value or a weighted average of another combination of the first-in-first-out occupancy value of the output, the shadow queue value of the output, the arbiter value, and the second effective congestion value. The output congestion value is measured in units of time (e.g., microseconds, milliseconds, clock cycles) or units of data (bytes, bits, kilobytes). The output congestion value may be unit less. The values may be weighted so the first-in-first-out occupancy value of the output, the shadow queue value of the output, the arbiter value, and the second effective congestion value can be compared.

The FIFO occupancy value of the output is a measure of how much memory in the queue of the output port is being used. As packets may arrive at the output faster than packets leave, data indicative of the packets are stored in the queue. The FIFO occupancy value is a count value of the number of packets or the total data amount stored in the queue.

The count value may track, in real time or in delayed time, the amount of data that is stored in the queue. The count value is measured in bytes. The count value may be a memory location that stores the current volume of the queue. The count value increases according to the quantity and/or volume of data packets sent to the queue.

The shadow queue value is associated with the FIFO occupancy value. The shadow queue value is based on a shadow data rate, which is less than the maximum data flow rate leaving the FIFO queue. The shadow rate may be a percentage of the maximum data flow rate leaving the FIFO queue. The shadow queue value lags the FIFO queue based on a difference between the data flow rate leaving the queue and the shadow rate.

The arbiter value describes the number of pending requests to an output from multiple inputs. The arbiter introduces delay to the data flow because the packets cannot be sent simultaneously. The number of pending request to activate a cross point and transmit a packet through the cross bar is the arbiter value. Alternatively, the sum of the packet size of the packets corresponding to the pending requests may be used to determine the arbiter value. The arbiter value may be scaled by a factor k as shown in Equation 1. The scaling factor k may be any value (e.g., 16, 32, 64). The scaling factor k may be variably defined.

The second effective congestion value is a congestion value received from a downstream node. For example, the second effective congestion value may be received from a fourth level node, downstream of the third level node 104a. The second effective congestion value may be zero or nil when the fourth level node is an egress node.

The second level node 102a includes copies of the output congestion logic 110b, replicated on each output, and a set of input logic 133 including memory for storing an average data intensity 132 and logic to compute an output selection 122, replicated on each input. The input logic which is included for each input may also include memory for storing and logic for calculating a congestion value matrix 134 and an input congestion value 124. The other nodes include logic with similar components, but are not shown to simplify FIG. 3.

The second level node 102a identifies a load balance set of outputs. The load balance set of outputs may include all of the outputs coupled to the second level node 102a. The load balance set may be defined according to a forwarding table queried with unicast labels from the packets. For example, the load balance set may include all the outputs through which the destination node defined based on an address in the data packet can be reached.

The second level node 102a determines an average data intensity or average bandwidth for each of the outputs connected to the second level node 102a or each of the outputs in the load balance set. One of the outputs of the second level node 102a corresponds to the third level node 104a. The average data intensity is based on recent data packet transmissions respectively to each of the outputs i. The average bandwidth for each output may be stored as a number of packets or a number of bytes sent to that output from the second level node 102a. A memory in the second level node 102a may store the average bandwidth matrix with one data entry for each input and output combination.

The third level node 104a sends its input congestion to the second level node 102a. The second level node 102a may also receive input congestion values from other outputs associated with nodes in the next stage. The second level node 102a stores the received congestion values as downstream congestion values associated to each of its outputs.

The second level node 102a is configured to calculate an effective congestion value for each of the outputs associated with nodes in the next stage. The effective congestion values for each output, which are stored at the current congestion value matrix 134, may be a function of the output congestion value for each output and the average data intensity or average bandwidth for each output, as shown by Equation 2a or alternatively Equation 2b.

$$\text{congestion}[i] = \text{outputCongestion}[i] + \text{averageBandwidth}[i] \qquad \text{Eq. 2a}$$

$$\text{congestion}[i] = \max(\text{outputCongestion}[i], \text{averageBandwidth}[i]) \qquad \text{Eq. 2b}$$

The second level node 102a compares the effective congestion values for the outputs associated with nodes in the next stage. The second level node 102a selects an output based on the comparison, which is stored at the output selection 122.

The first level node 100a includes an output congestion logic and memory for storing an output selection. The output congestion logic may be similar to output congestion logic 110b, but is not included in FIG. 3 for ease of illustration. The first level node 100a receives the output congestion value of second level node 102a from second level node 102a. The first level node 102a selects an output based on a comparison of current congestion values using Equation 2. As shown in FIG. 3, the output of first level node 100a may be the second level node 102a.

Figure 4:
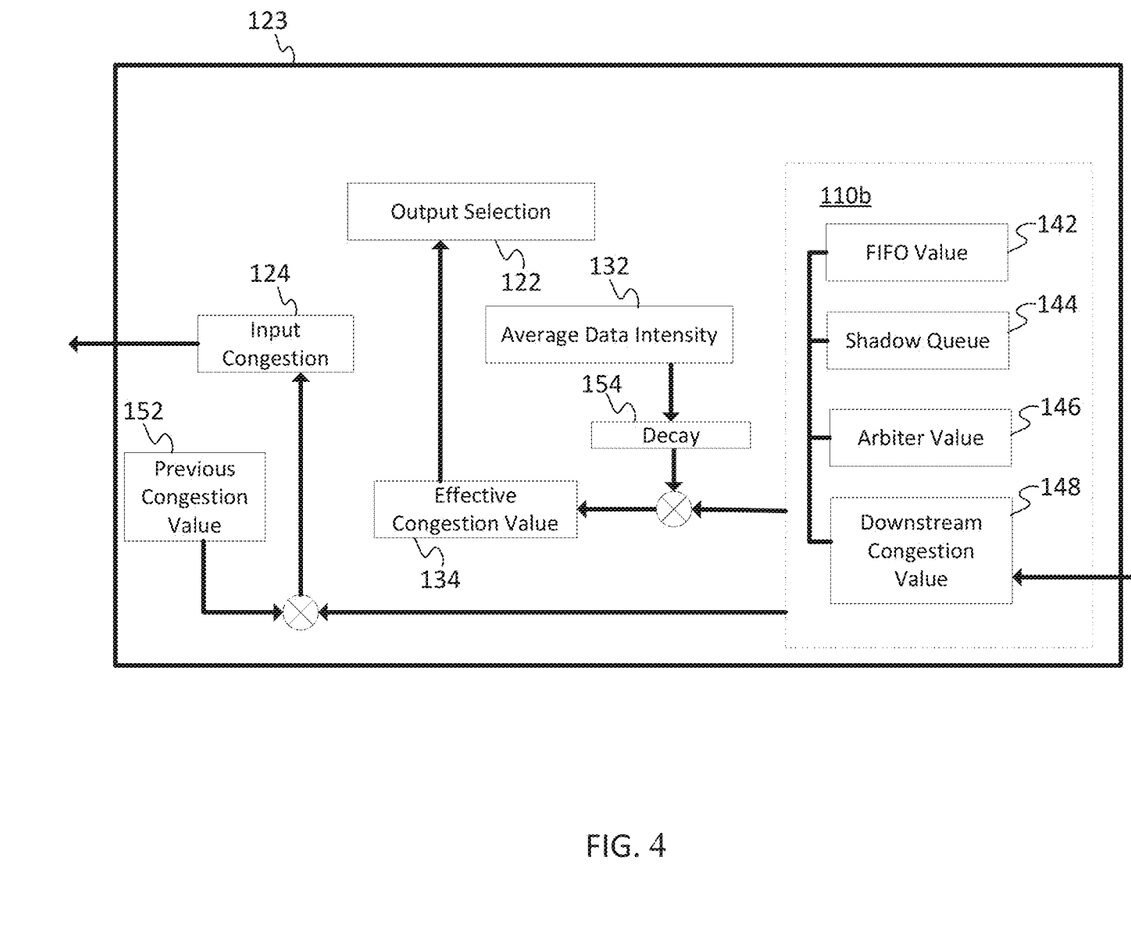
FIG. 4 illustrates another embodiment of an example node of FIG. 2.

All of the nodes (e.g., the first level node 100a, the second level node 102a, and the third level node 104a) may include a similar logical arrangement of components as shown in FIG. 4 as node 123. The node 123 includes output congestion logic 110b configured to operate according to Equation 1, as described above.

In addition, the node 123 is configured to select an output through a comparison of congestion values for possible outputs as determined by Equation 2. Before inputting into Equation 2, each input in node 123 may calculate the average data intensity 132 for each output according to Equation 3. The average data intensity is decayed repeatedly at every predetermined interval based on the previous average data intensity for the output. The decay calculation is performed by decay calculator 154 according to a decay coefficient D. D may be any value from 0 to 1 (e.g., $^{15}/_{16}$, $^{7}/_{8}$, %). The decay calculator 154 adjusts the current data intensity at time t based on the recent data intensity at time t−1.

$$\text{averageBandwidth}[i]_t = D \times \text{averageBandwidth}[i]_{t-1} \qquad \text{Eq. 3}$$

After calculating the congestion value from Equation 2, the node 123 also determines an input congestion value 124 to be sent upstream. The nodes upstream of node 123 use the input congestion value 124 of node 123 as the downstream congestion value use by the upstream nodes in Equation 1. The input congestion value 124 may be defined according to a past input congestion value 124 and the current output congestion value, as shown in Equation 4. The input congestion value 124 is a weighted average of the past input congestion value, which is stored in memory as previous congestion value 152, and the current output congestion value according to a ratio $W_1/W_2$. Example ratios include $^{3}/_{4}$, $^{7}/_{8}$, and $^{15}/_{16}$. The ratio may be any $(n−1)/n$ where n is an integer. The ratio may be such that $W_1$ is any number between 0 and 1, and $W_2$ is 1.

$$\text{inputCongestion }[i]_t = \frac{W_1 \times \text{inputCongestion }[i]_{t-1} + \text{outputCongestion }[i]_t}{W_2} \qquad \text{Eq. 4}$$

Logic for the output selection 122 selects an output for each data packet. The output selection 122 may select the output that corresponds to the lowest output congestion value. Alternatively, the output selection 122 may be configured to select a predetermined number of possible outputs with the lowest output congestion values. The output selection 122 may randomly select the output from the possible outputs with the lower output congestion values. The output selection 122 may be configured to select the output from the possible outputs with the lower output congestion values using a random function.

The node 123, as well as the other nodes, is configured to send the input congestion value upstream. The input congestion value is sent upstream using a short data message. The message may include an identifier field and the input congestion value. The identifier field defines the message as a congestion message. The origin field that includes data indicative of the stage including the node that generate the message. The congestion messages may be generate every predetermined time period (e.g., 1 microsecond, 1 millisecond). The congestion message may be generated using a random period. The period could be a random variable uniformly distributed, for example between 1 microsecond and 2 microseconds. The period could also be an exponentially distributed random variable, with an average, for example of 1 microsecond. The congestion messages in the reverse flow may be smaller than the forward flowing data packets.

Figure 5:
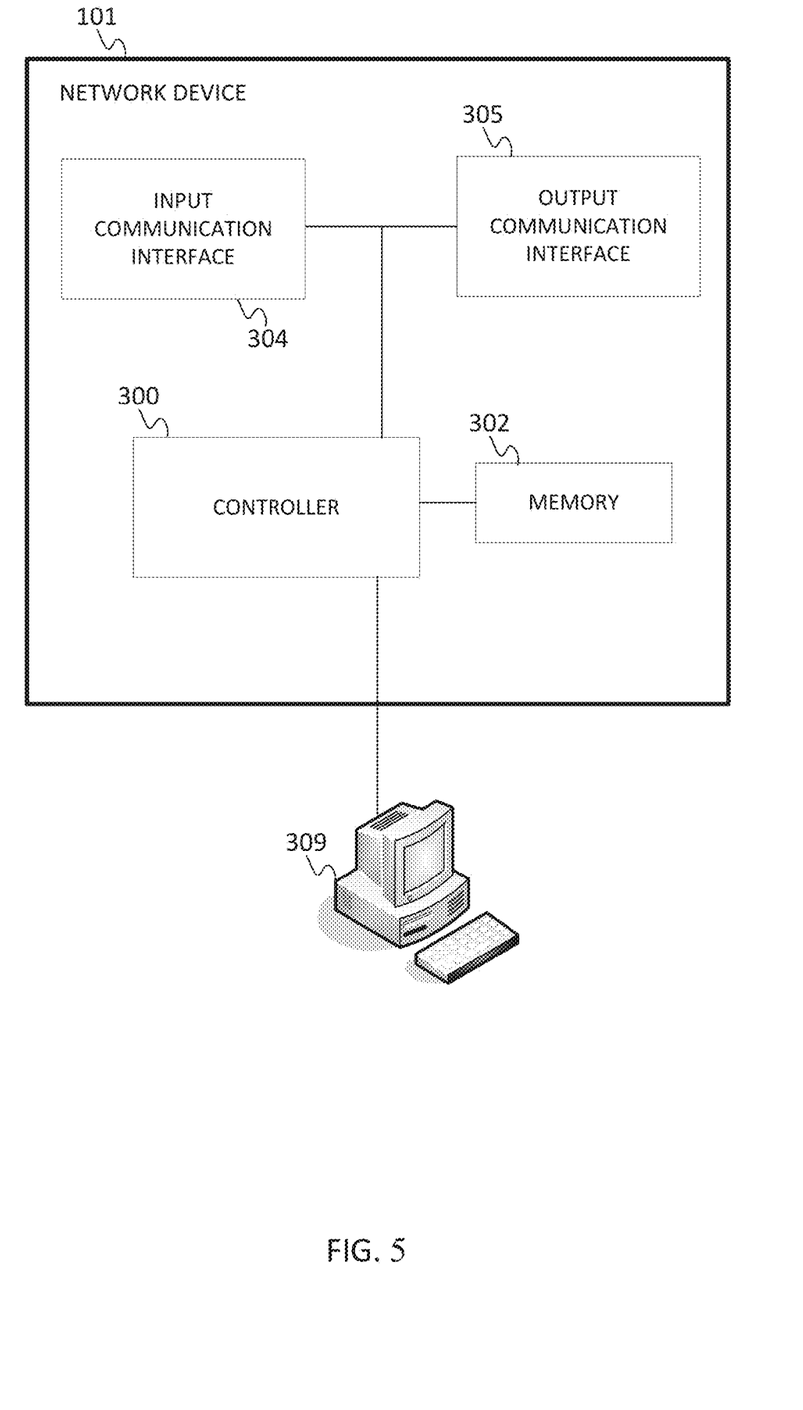
FIG. 5 illustrates another example embodiment of a node of FIG. 1.

FIG. 5 Illustrates an example network device 101 configured for unicast communication. The network device 101 may include one or more integrated circuits programmed or designed to forward data packets. For example, the network device 101 may include an application specific integrated circuit (ASIC). Other devices than ASIC may be used, such as field programmable gate arrays or general processors. The network device 101 includes at least a controller 300, a memory 302, an input communication interface 304, and an output communication interface 305. The network device 101 may also communicate with a workstation 309.

The input communication interface 304 may include one or more ingress ports. The input communication interface 304 is configured to receive a sequence of data packets from an upstream node. The input communication interface 304 is configured to receive an output congestion value from each of the outputs from one or more downstream nodes.

The controller 300 includes logical circuitry or hardware for performing load balancing. The controller 300 is configured to calculate an effective congestion value for each of the possible outputs as a function of the output congestion value and average data intensity. The average data intensity is based on recent data packet transmissions respectively to each of the possible outputs. The controller 300 selects one of the possible outputs based on a comparison of the effective congestion values for the outputs.

The controller 300 may be configured to increment the average data intensity according to incoming packets and decrements the average data intensity according to time. The average intensity for each output is increased based on the number of packets and/or the size of the packets sent to each output by the input port. The port may be configured to decrement the average data intensity over time. For example, each iteration of the congestion value calculations may decay the average data density. The rate of decay may be any percentage.

The output congestion value is based on one or more of a first-in-first-out (FIFO) occupancy value of the output, a shadow queue value of the output, an arbiter value, and a downstream congestion value. The output congestion value may be selected as the greatest value of scaled or normalized values of the first-in-first-out occupancy value of the output, the shadow queue value of the output, the arbiter value, and the second effective congestion value.

In one example, the data rate of the packets going into the node is P. The rate of change of a virtual queue or shadow queue is associated with P. For example, the count of the virtual queue may increase by amounts of data defined by P. The drain of data leaving the real queue is R. R is defined by the speed of the communication path at the output of the real queue. The drain rate of data (or decrement rate of the count value) of the virtual queue is less than R, which may be defined as $R*(1-\epsilon)$, where is $\epsilon$ is a decimal or fractional value between 0 to 1. Example values for $\epsilon$ include ¼, ⅛, 1/16, Pi/4 (0.785) or ⅗. Any number between 0 and 1 is possible.

The selection of epsilon $\epsilon$ dictates how the virtual queue varies in time with respect to the real queue. If $\epsilon$ is large, then the virtual queue indicates congestion when no congestion exists or the likely future congestion never exists. If $\epsilon$ is small, then the difference in growth rate between the virtual queue and the real queue is very small. When $\epsilon$ is zero, then the real queue and the virtual queue drain at the same rate. Effectively, the virtual queue, when $\epsilon$ is set to zero, measures the real queue volume as an indication of congestion. The rates P, R, and $R*(1-\epsilon)$ may refer to instantaneous rates or average rates over a time period. Example time periods include 5 microseconds, 1 milliseconds, 100 microseconds, 1 second, and 10 seconds.

Four scenarios are possible. The first is a scenario when P is less than $R*(1-\epsilon)$. Because P is less than R, no packet data accumulates in the real queue. Because P is less than $R*(1-\epsilon)$, the count value does not increase. Therefore, the real queue volume is empty and the virtual queue value is zero. The second is a scenario when P is equal to $R*(1-\epsilon)$. Because P is less than R, no packet data accumulates in the real queue. Because P equals than $R*(1-\epsilon)$, the count value does not increase or decrease. Therefore, the real queue volume is empty, and the count value of the virtual queue is constant.

The third is a scenario when P is greater than $R*(1-\epsilon)$ and P is less than R. Because P is less than R, no packet data accumulates in the real queue. Because P is greater than $R*(1-\epsilon)$, the count value increases. Therefore, even though no congestion has occurred in the real queue, the virtual queue provides an early warning of potential congestion in the real queue. The count of the virtual queue is an indication of future congestion in the real queue. In addition, the virtual queue may have values related to past congestion of the real queue. Therefore, the virtual queue is an indicator of long term congestion.

The fourth is a scenario when P is greater than R. Because P is greater than R, the real queue volume increases. The real queue may be congested or may be congested after the amount of time required for the real queue to be full (e.g., 10 milliseconds). Because P is much greater than $R*(1-\epsilon)$, the count value increases at a rate greater than the rate that the count value increased in the third scenario. The count value increases at a rate faster than the real queue volume, which provides an indication that the real queue may soon be congested. The count value also provides an indication that the real queue is already congested.

Figure 6:
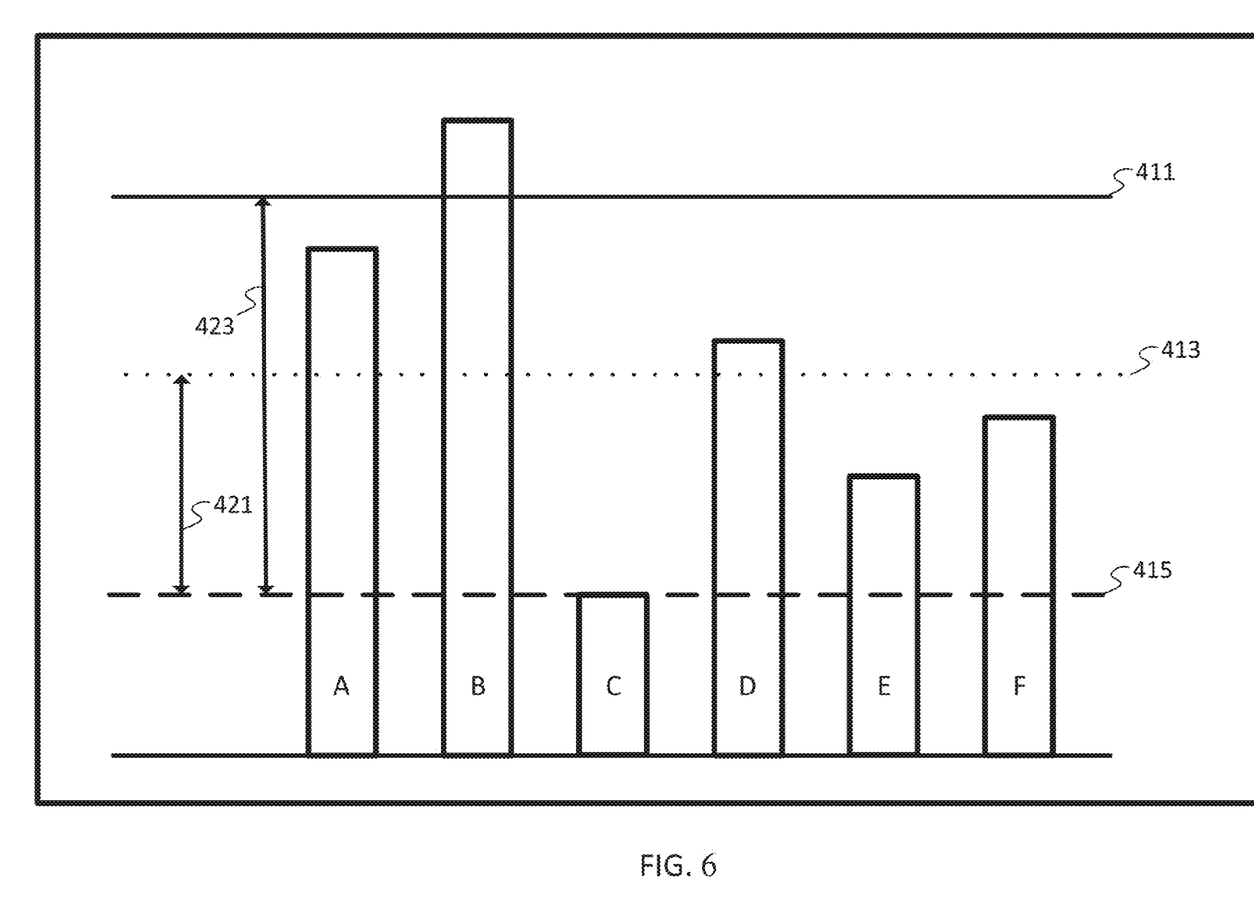
FIG. 6 illustrates a chart for an output selection algorithm.

FIG. 6 illustrates an output selection algorithm for the controller 300 to select the output for a received packet. The output selection algorithm may be a random inverse weighted round robin algorithm. The output selection algorithm may be another fuzzy logic based algorithm. In the output selection algorithm, an allowed range is based on the minimum output congestion value of the eligible outputs and a predetermined size of the allowed range. FIG. 6 illustrates a bar graph in which each bar represents the output congestion value for outputs A through F. The smallest output congestion value corresponds to output C. A dashed line 415 is the smallest output value, which defines the lower bound of the allowable range. A solid line 411 defines the upper bound of the allowable range. The difference 423 between the solid line 411 and the dashed line 415 represents the predetermined size of the allowed range, which may be configurable by the network device 101. The solid line 411 moves according to the allowable range and the minimum output congestion value.

The dotted line 413 represents the eligibility of the outputs. The location of dotted line 413 may be dependent on a random number or any function such that the location of dotted line 413 varies in time. Outputs with output congestion values greater than the dotted line 413 are not eligible to be selected by the node. Outputs with output congestion values less than the dotted line 413, as shown by range 421, are eligible outputs. The range 421 may be a uniformly distributed random number between 0 and the maximum size of the allowed range 423. Therefore, in addition to output C with the smallest output congestion value, other outputs are eligible such as nodes E and F.

The node may select from nodes C, E, and F for the output using the round robin algorithm. For example, the node may perform a modulus of N operation on an identification value, or the output congestion value, of each of the outputs and select the output with a remainder closest to a target value. When the next packet arrives, the node increments the target value by one and resets when the target value reaches N. Accordingly, the same output is not selected repeatedly even when the output repeatedly reports the lowest output congestion value. Alternatively, the node may randomly select one of the eligible outputs.

The controller 300 may include a general processor, digital signal processor, an application specific integrated circuit (ASIC), field programmable gate array (FPGA), analog circuit, digital circuit, combinations thereof, or other now known or later developed processor. The controller 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device 101, such as a secure digital (SD) memory card.

In addition to ingress ports and egress ports, the input communication interface 304 and the output communication interface 305 may include any operable connection. An operable connection may be one in which signals, physical communications, and/or logical communications may be sent and/or received. An operable connection may include a physical interface, an electrical interface, and/or a data interface.

Figure 7:
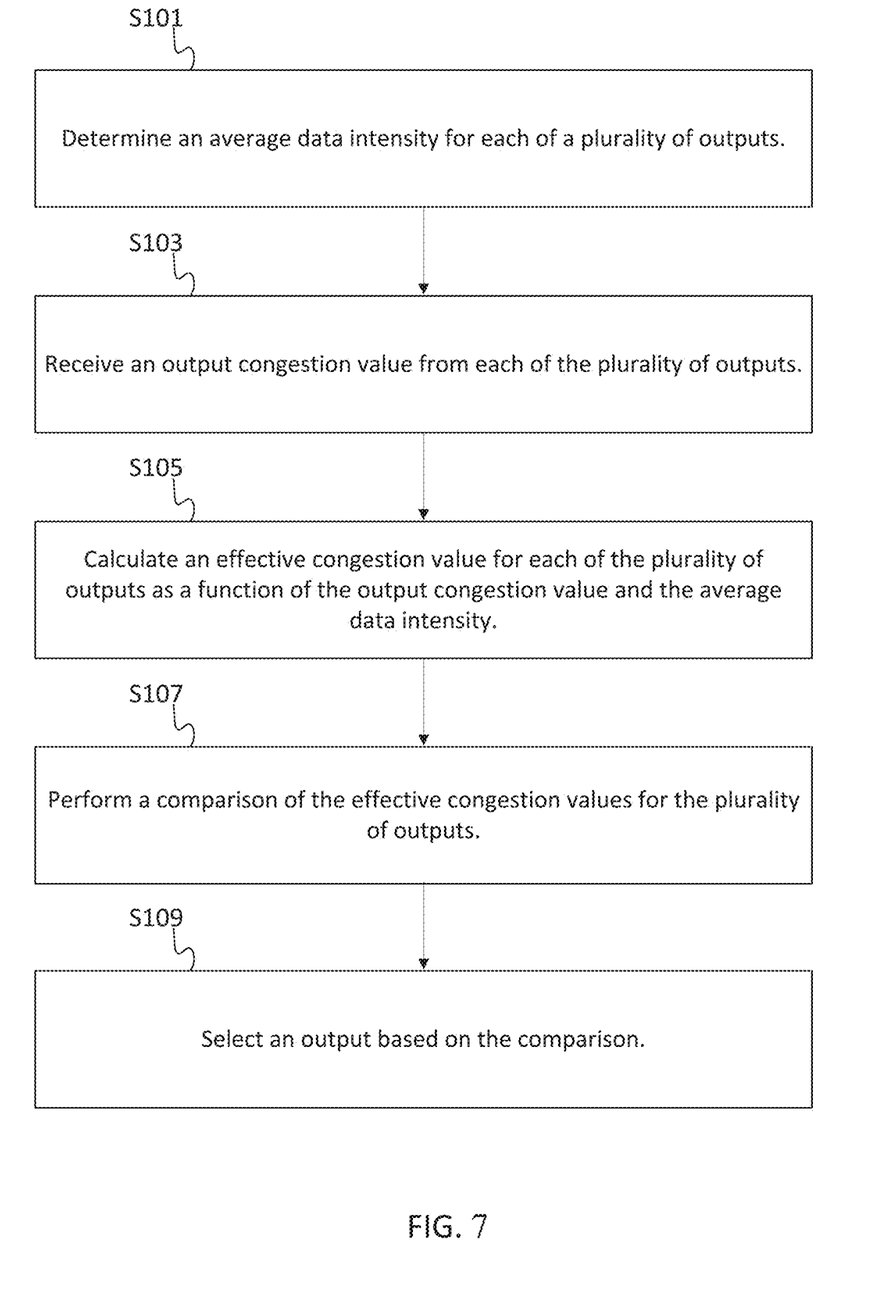
FIG. 7 illustrates an example flowchart for one embodiment of fabric load balancing.

FIG. 7 illustrates an example flowchart for one embodiment of fabric load balancing. An input belonging to a fabric node receives a packet. The fabric is a network topology in which network nodes connect with each other via network switches or cross bar switches. The fabric may be in a single device having multiple nodes within or a network of devices, each functioning as a node.

At act S101, an input in the current node determines an average data intensity for a load balance set of outputs. The members of the load balance set of outputs may be determined according to the header of the packet. The respective average data intensities describe how many packets have been sent by that input to the various outputs.

At act S103, the input receives an output congestion value from each of the plurality of outputs corresponding to downstream nodes. The outputs calculate the output congestion values based on a real queue value of the output, a virtual queue value of the output, an arbiter value of the output, and an input congestion value of a downstream node. Therefore, an indication of highly congested nodes near the destination node is propagated in the reverse direction along the path.

At act S105, the input calculates an effective congestion value for each of the outputs as a function of the output congestion value and the average data intensity. The effective congestion value may be the sum of the output congestion value and the average data intensity. The effective congestion value may be a weighted average of the output congestion value and the average data intensity. The effective congestion value may be the max of the output congestion value and the average data intensity, each weighted differently. Either or both of the output congestion value and the average data intensity may be decayed over time.

At act S107, the input compares the effective congestion values calculated for each of the eligible outputs. At act S109, the node selects an output based on the comparison. The comparison may identify an output with the lowest effective congestion value. The comparison may identify a set of allowable outputs based on an allowable range. One of the set of allowable outputs may be selected using a random function or a round robin algorithm. The round robin algorithm semi-randomly alternates between the allowable outputs.

For example, the allowable outputs may be selected in a frequency inversely proportional to the values for the effective congest values. If there are three allowable outputs, the output with the lowest effective congestion value is selected more than the output with the next lowest effective congestion value, and the output with the next lowest effective congestion value is selected more than the output with the highest effective congestion value. Such a pattern may be achieved by adding a bias value to the next iteration of the effective congestion value for each output after the output has been selected. The bias may be the average data intensity. Values that are frequently selected are biased more and should be chosen less frequently.

At the inputs, the network device receives a flow of incoming packets. The flow of incoming packets may include a sequence of data packets. The data packets include control information (e.g., a label) and a payload. The label may include a destination label, a source address, a packet identification value, a sequence value, and/or a checksum or other error correcting code.

The network device 101 may be a node in a network. The network device 101 may be a node within a switch. The network device may be a destination node or a source node, or include both the destination node and the source node. Generally, the source node sends traffic to the destination node through a variety of paths. A periodic series of packets from the destination node to the source node include data indicative of congestion values. The congestion values may be measured in packets (quantity), bandwidth (bits/second), or total volume (bytes). The destination node defines that acceptable amount of traffic such that it does not exceed the speed of the link between the source node and the destination node. There may be multiple communication paths transverse multiple intermediate nodes between the source node and the destination node. The intermediate nodes may have different levels of congestion.

Multicast may be implemented by replicating a received packet for distribution to a set of output ports by way of a set of output queues. A multicast packet includes a label for the multicast group that defines the destinations of the multicast packet. A bitmap (e.g., a fabric port of exit (FPOE) bitmap) may define which of the set of output queues the multicast packet is to be forwarded to in order to reach the destinations.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   determining an average data intensity for each of a plurality of outputs, wherein the average data intensity is based on recent data packet transmissions respectively to each of the plurality of outputs;
   receiving an output congestion value from each of the plurality of outputs;
   calculating, by a processor, an effective congestion value for each of the plurality of outputs, wherein the effective congestion value is a function of the output congestion value and the average data intensity;
   performing, by the processor, a comparison of the effective congestion values for the plurality of outputs; and
   selecting an output based on the comparison,
   wherein the output congestion value is calculated based on at least one of a shadow queue value of the output or an arbiter value,
   wherein when the output congestion value is calculated based on the shadow queue value of the output, the shadow queue value of the output is a virtual queue size for the output, and
   wherein when the output congestion value is calculated based on the arbiter value, the arbiter value reflects packets with a pending arbiter request.

2. The method of claim 1, wherein the output is selected by a round robin algorithm from a set of allowable outputs, wherein the set of allowable outputs is a subset of the plurality of outputs defined by an allowable range for the output congestion value.

3. The method of claim 1, wherein the output congestion value is based on data received from a downstream node.

4. A method comprising:
   determining an average data intensity for each of a plurality of outputs, wherein the average data intensity is based on recent data packet transmissions respectively to each of the plurality of outputs;
   receiving an output congestion value from each of the plurality of outputs;
   calculating, by a processor, an effective congestion value for each of the plurality of outputs, wherein the effective congestion value is a function of the output congestion value and the average data intensity;
   performing, by the processor, a comparison of the effective congestion values for the plurality of outputs; and selecting an output based on the comparison, wherein the output congestion value is calculated based on a second effective congestion value received from a downstream node.

5. The method of claim 4, further comprising:
forwarding a data packet to the selected output.

6. The method of claim 5, further comprising:
updating the average data intensity based on the forwarded data packet.

7. The method of claim 5, further comprising:
identifying the plurality of outputs based on an address in the data packet.

8. A method comprising:
determining an average data intensity for each of a plurality of outputs, wherein the average data intensity is based on recent data packet transmissions respectively to each of the plurality of outputs;
receiving an output congestion value from each of the plurality of outputs;
calculating, by a processor, an effective congestion value for each of the plurality of outputs, wherein the effective congestion value is a function of the output congestion value and the average data intensity;
performing, by the processor, a comparison of the effective congestion values for the plurality of outputs;
selecting an output based on the comparison, and
calculating a current congestion value for an input based on a weighted average of a past congestion value for the input and the effective congestion value of the selected output.

9. The method of claim 8, further comprising:
sending the current congestion value for the input to an upstream node as an effective congestion value.

10. A network device comprising:
an input communication interface configured to receive an output congestion value from each of a plurality of eligible outputs; and
a processor configured to calculate a first effective congestion value for each of the plurality of eligible outputs as a function of the output congestion value and an average data intensity, wherein the average data intensity is based on recent data packet transmissions respectively to each of the plurality of eligible outputs;
wherein the processor selects one of the plurality of eligible outputs based on a comparison of the first effective congestion values for the plurality of eligible outputs, wherein the output congestion value is calculated based on a second effective congestion value received from a node downstream of the network device.

11. The network device of claim 10, wherein the processor selects the one of the plurality of eligible outputs from a narrowed set of eligible outputs that falls within an allowable range.

12. The network device of claim 11, wherein the processor is configured select from the narrowed set of eligible outputs based on a round robin algorithm.

13. The network device of claim 11, wherein the processor is configured to increment the average data intensity according to incoming packets and decrement the average data intensity according to time.

14. A non-transitory computer readable medium containing instructions that when executed are configured to:
determine an average data intensity for each of a plurality of outputs available to a current node, wherein the average data intensity is based on recent data packet transmissions respectively to each of the plurality of outputs;
receive an output congestion value from a plurality of downstream nodes;
calculate an effective congestion value for each of the plurality of outputs, wherein the effective congestion value is a function of the output congestion value and the average data intensity;
select a lowest of the effective congestion values for the plurality of outputs; and
forward an indication of the lowest of the effective congestion values to an upstream node,
wherein the output congestion value is calculated based on a downstream effective congestion value received from a node downstream of the current node.

15. The non-transitory computer readable medium of claim 14, the instructions further configured to:
select an output that corresponds to a lowest of the effective congestion values; and
forward a packet to one of the plurality of downstream nodes coupled to the output that corresponds to the lowest of the effective congestion values.

16. The non-transitory computer readable medium of claim 14, wherein the output congestion value is calculated based on a shadow queue value that lags a queue of the output.

* * * * *